US011707947B2

(12) United States Patent
Knospe

(10) Patent No.: US 11,707,947 B2
(45) Date of Patent: Jul. 25, 2023

(54) PRE-STRAINED NON-PNEUMATIC TIRE AND METHOD OF MAKING SAME

(71) Applicant: Bridgestone Americas Tire Operations, LLC, Nashville, TN (US)

(72) Inventor: Benjamin D. Knospe, Merrill, WI (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 234 days.

(21) Appl. No.: 17/058,408

(22) PCT Filed: May 22, 2019

(86) PCT No.: PCT/US2019/033484
§ 371 (c)(1),
(2) Date: Nov. 24, 2020

(87) PCT Pub. No.: WO2019/240920
PCT Pub. Date: Dec. 19, 2019

(65) Prior Publication Data
US 2021/0155042 A1 May 27, 2021

Related U.S. Application Data

(60) Provisional application No. 62/684,936, filed on Jun. 14, 2018.

(51) Int. Cl.
*B60C 7/14* (2006.01)
*B29D 30/02* (2006.01)
*B60C 7/10* (2006.01)
(52) U.S. Cl.
CPC ............. *B60C 7/143* (2013.01); *B29D 30/02* (2013.01); *B60C 7/107* (2021.08)

(58) Field of Classification Search
USPC ........................................................ 156/113
See application file for complete search history.

(56) References Cited

U.S. PATENT DOCUMENTS

| 5,460,213 A | 10/1995 | Pajtas |
| 2008/0053586 A1 | 3/2008 | Hanada et al. |
| 2011/0079335 A1 | 4/2011 | Manesh et al. |

(Continued)

FOREIGN PATENT DOCUMENTS

| CN | 101134420 A | 3/2008 |
| CN | 102555674 | 7/2012 |

(Continued)

OTHER PUBLICATIONS

Supplementary European Search Report; Corresponding EP Application No. EP19819672.7; dated Feb. 10, 2022.

(Continued)

*Primary Examiner* — Katelyn W Smith
*Assistant Examiner* — Alexander D Booth
(74) *Attorney, Agent, or Firm* — Shaun J. Fox; Bryan J. Jaketic

(57) ABSTRACT

A pre-strained non-pneumatic tire has an inner ring, an outer ring, and a plurality of polymeric connecting elements extending from the inner ring to the outer ring. The pre-strained non-pneumatic tire made by a process that includes forming an initial non-pneumatic tire and straining at least a portion of one of the plurality of polymeric connecting elements.

10 Claims, 12 Drawing Sheets

(56) References Cited

U.S. PATENT DOCUMENTS

| | | | |
|---|---|---|---|
| 2013/0048174 A1 | 2/2013 | Cron | |
| 2016/0096400 A1 | 4/2016 | Nomura et al. | |
| 2019/0184658 A1* | 6/2019 | Downing | ........... B29D 30/0016 |

FOREIGN PATENT DOCUMENTS

| | | | |
|---|---|---|---|
| CN | 111114204 | 5/2020 | |
| GB | 10998 | 5/1914 | |
| JP | 2008-55928 | 3/2008 | |
| JP | 2010-522666 A | 7/2010 | |
| JP | 2016-074249 A | 5/2016 | |
| KR | 101852305 | 4/2018 | |
| WO | 2012171055 | 12/2012 | |
| WO | 2017117587 | 7/2017 | |
| WO | 2017117606 | 7/2017 | |
| WO | WO-2017116804 A1 * | 7/2017 | ....... B29C 45/14065 |

OTHER PUBLICATIONS

International Search Report and Written Opinion; Corresponding PCT Application Serial No. PCT/US2019/033484, International Filing Date May 22, 2019; Authorized Officer Chan Yoon Hwang; dated Aug. 29, 2019.

* cited by examiner

US 11,707,947 B2

PRE-STRAINED NON-PNEUMATIC TIRE AND METHOD OF MAKING SAME

FIELD OF INVENTION

The present disclosure relates to a non-pneumatic tire. More particularly, the present disclosure relates to a non-pneumatic tire having pre-strained components.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. Non-pneumatic tires may include a plurality of spokes, a webbing, or other connecting elements that connect an inner ring to an outer ring.

When a non-pneumatic tire is mounted on a vehicle, tensile forces are exerted on the connecting elements located above an axis of the tire, while compression forces are exerted on connecting elements below the axis. The compression forces may cause the connecting elements to buckle. The spokes or webbing may experience low levels of strain while in tension, but much higher strain when buckling under compression. For example, the connecting elements may experience 1-2% strain in tension, and 10-15% strain when buckling under compression. In other instances, the connecting elements may experience up to 30% or even higher levels of strain when buckling under compression.

It is possible to reduce the strain on the connecting elements under compression by using a stiffer material for the spokes or webbing, but this may have detrimental effects on the tire performance. Alternatively, strain may be reduced by using thicker spokes or webbing, but this adds weight to the tire. It would be beneficial to reduce strain on the spokes or webbing without using thicker or stiffer materials.

SUMMARY OF THE INVENTION

In one embodiment, a method of making a non-pneumatic tire includes forming an initial tire having an inner ring with an inner diameter, an outer ring with a first outer diameter, and a plurality of connecting elements extending from the inner ring to the outer ring. The method further includes stretching the outer ring in a radial direction, until the outer ring has a second outer diameter greater than the first outer diameter. The plurality of connecting elements remain connected to the inner ring and the outer ring during the stretching of the outer ring, such that the stretching the outer ring in a radial direction causes the plurality of connecting elements to stretch in a radial direction. The plurality of connecting elements remain connected to the inner ring and the outer ring after the stretching of the outer ring.

In another embodiment, a pre-strained non-pneumatic tire has an inner ring, an outer ring, and a plurality of polymeric connecting elements extending from the inner ring to the outer ring. The pre-strained non-pneumatic tire is made by a process that includes forming an initial non-pneumatic tire and straining at least a portion of one of the plurality of polymeric connecting elements.

In yet another embodiment, a method of making a non-pneumatic tire includes providing a plurality of tire components, each of the tire components including at least one of an inner ring portion, an outer ring portion, and connecting elements configured to connect the inner ring portion to the outer ring portion. The method further includes stretching at least one of the tire components, until the connecting elements have been stretched from a first length to a second length. The method further includes assembling the plurality of tire components to form a non-pneumatic tire.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
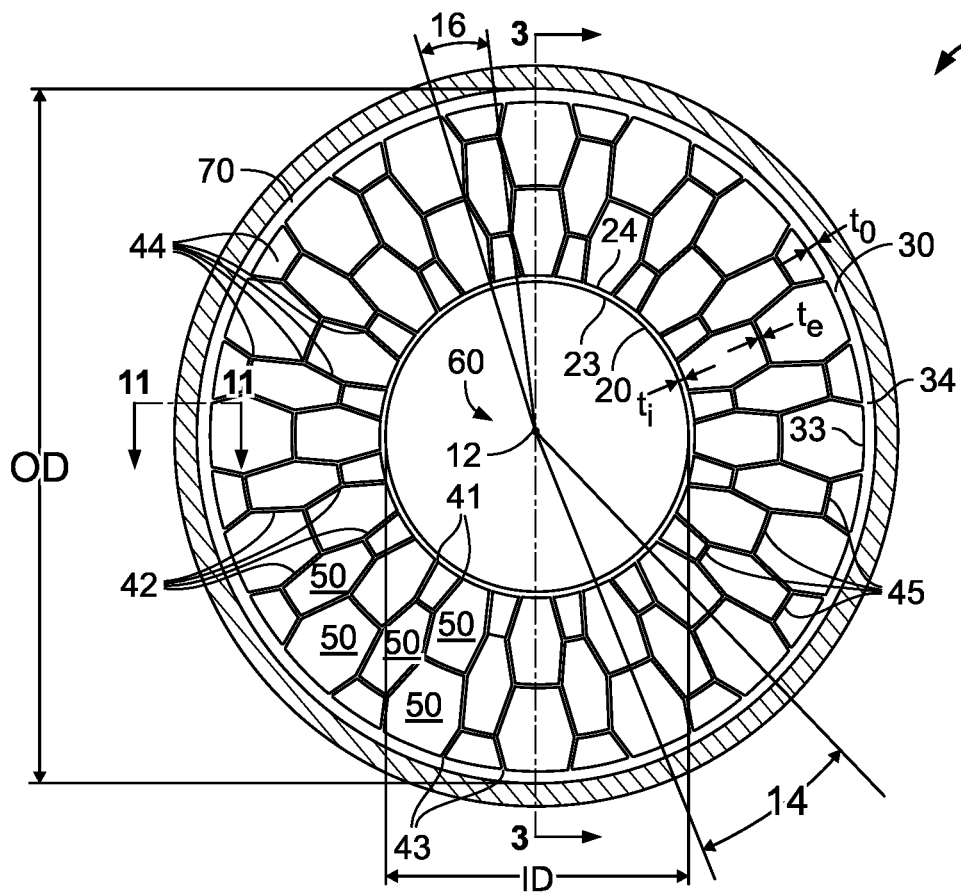
FIG. 1 is a front view of an undeformed non-pneumatic tire.
Figure 2:
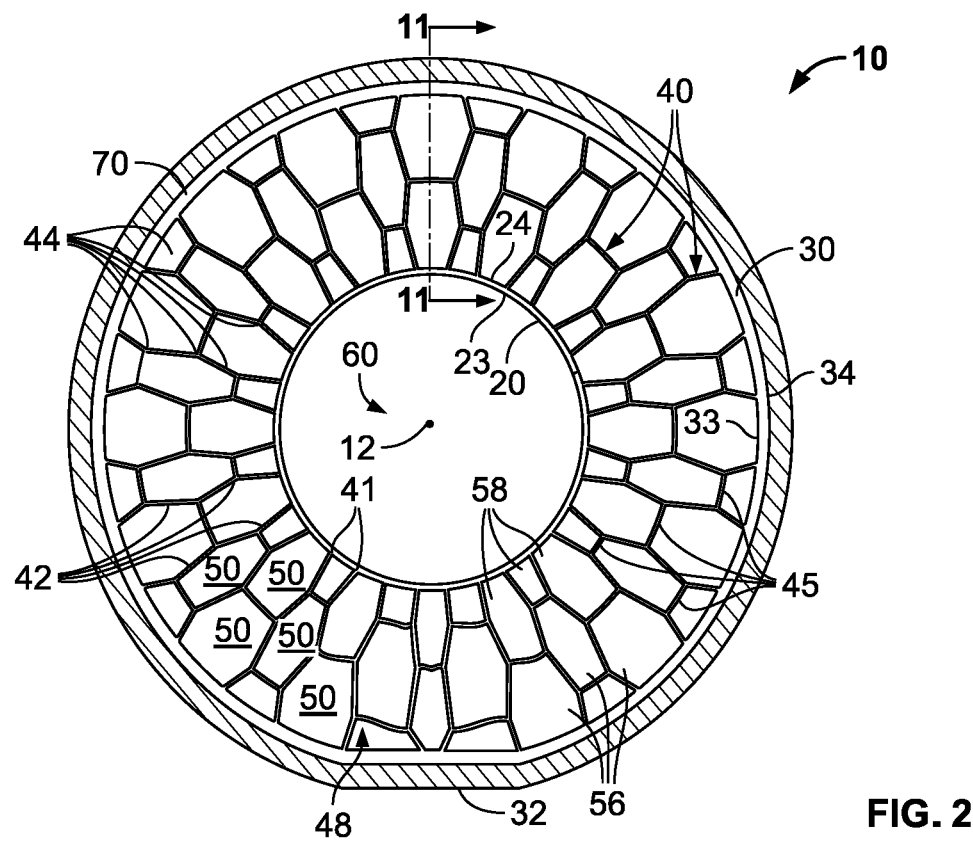
FIG. 2 is a front view of the non-pneumatic tire of FIG. 1 being deformed when subjected to a load.
Figure 3:
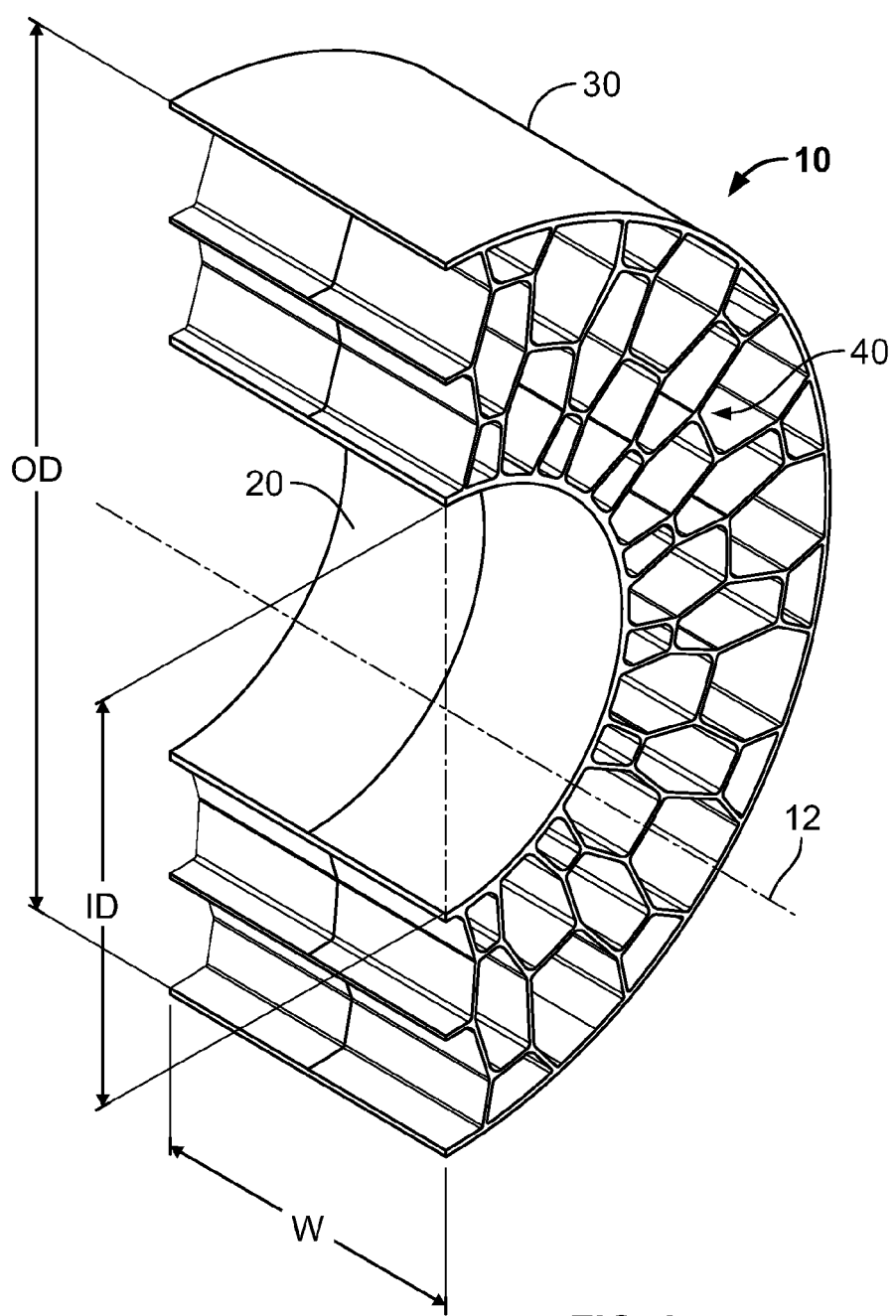
FIG. 3 is a sectional perspective view of the undeformed non-pneumatic tire taken along line 3-3 in FIG. 1.

FIGS. 1-3 illustrate one embodiment of a non-pneumatic tire 10. In the illustrated embodiment, the non-pneumatic tire 10 includes a generally annular inner ring 20 that engages a wheel 60 to which the tire 10 is mounted. The wheel 60 has an axis of rotation 12 about which the tire 10 rotates. The generally annular inner ring 20 has an internal surface 23 and an external surface 24 and can be made of cross-linked or uncross-linked polymers. In this disclosure, the term "polymer" means cross-linked or uncross-linked polymers.

For smaller applied loads, the generally annular inner ring 20 can be adhesively engaged with wheel 60 or can undergo some chemical structure change allowing it to bond to the wheel 60. For larger applied loads, the generally annular inner ring 20 can be engaged to the wheel 60 via some form of a mechanical connection such as a mating fit, although a mechanical connection can be used for supporting smaller loads as well. The mechanical engagement can provide both the wheel 60 and the generally annular inner ring 20 with extra strength to support the larger applied load. In addition, a mechanical connection has the added benefit of ease of interchangeability. For example, if the non-pneumatic tire 10 needs to be replaced, generally annular inner ring 20 can be detached from wheel 60 and replaced. The wheel 60 can then be remounted to the axle of the vehicle, allowing the wheel 60 to be reusable. In another embodiment, the inner ring 20 can be connected to the wheel 60 by a combination of a mechanical and adhesive connection.

With continued reference to FIGS. 1-3, the non-pneumatic tire 10 further includes a generally annular outer ring 30 surrounding an interconnected web 40 that is connected to the generally annular inner ring 20. In alternative embodiments, a plurality of spokes or other connecting devices connect the inner ring to the outer ring.

The outer ring 30 can be configured to deform in an area around and including a footprint region 32 (see FIG. 2), which decreases vibration and increases ride comfort. However, since in some embodiments the non-pneumatic tire 10 does not have a sidewall, the generally annular outer ring 30, combined with the interconnected web 40, can also add lateral stiffness to the tire 10 so that the tire 10 does not unacceptably deform in portions away from the footprint region 32.

In one embodiment, the generally annular inner ring 20 and a generally annular outer ring 30 are made of the same material as interconnected web 40. The generally annular inner ring 20 and the generally annular outer ring 30 and the interconnected web 40 can be made by injection or compression molding, castable polymer, additive manufacturing, or any other method generally known in the art and can be formed at the same time so that their attachment is formed by the material comprising the inner ring 20, the outer ring 30 and the interconnected web 40 cooling and setting.

As shown in FIG. 1, the generally annular outer ring 30 can have a radially external surface 34 to which a tread carrying layer 70 is attached. Attachment can be done adhesively or using other methods commonly available in the art.

As shown in FIGS. 1-3, the interconnected web 40 of non-pneumatic tire 10 connects the generally annular inner ring 20 to the generally annular outer ring 30. In the illustrated embodiment, the interconnected web 40 has at least two radially adjacent layers 56, 58 of web elements 42 that define a plurality of generally polygonal openings 50. In other words, with at least two adjacent layers 56, 58, a slice through any radial portion of the non-pneumatic tire 10 extending from the axis of the rotation 12 to the generally annular outer ring 30 passes through or traverses at least two generally polygonal openings 50. The polygonal openings 50 can form various shapes. In many embodiments, a majority of generally polygonal openings 50 can be generally hexagonal shape with six sides. However, it is possible that each one of the plurality of generally polygonal openings 50 has at least three sides.

The interconnected web 40 can further include intersections 44 between web elements 42 in order to distribute an applied load throughout the interconnected web 40. In the illustrated embodiments, each intersection 44 joins at least three web elements 42. However, in other embodiments, the intersections 44 can join more than three web elements 42, which can assist in further distributing the stresses and strains experienced by web elements 42.

With reference back to FIG. 2, the combination of the geometry of interconnected web 40 and the material chosen in interconnected web 40 can enable an applied load to be distributed throughout the web elements 42. Because the web elements 42 may be relatively thin and can be made of a material that is relatively weak in compression, those elements 42 that are subjected to compressive forces may have a tendency to buckle. These elements are generally between the applied load that generally passes through axis of rotation 12 and footprint region 32 and are represented as buckled section 48 in FIG. 2.

In one embodiment, some or all of the web elements 42 can be provided with weakened (e.g., previously bent) or thinned sections such that the web elements 42 preferentially bend or are biased to bend in a certain direction. For example, in one embodiment, the web elements are biased such that they bend generally in an outwardly direction. In this manner, web elements do not contact or rub against each other as they buckle. In addition, the position of the weakened or thinned portion can be used to control the location of the bending or buckling to avoid such contact.

When buckling occurs, the remaining web elements 42 may experience a tensile force. These tensioned web elements 42 support the applied load. Although relatively thin, because web elements 42 can have a high tensile modulus they can have a smaller tendency to deform but instead can help maintain the shape of the tread carrying layer 70. In this manner, the tread carrying layer 70 can support the applied load on the tire 10 as the applied load is transmitted by tension through the web elements 42. The tread carrying layer 70, in turn, acts as an arch and provides support. Accordingly, the tread carrying layer 70 is sufficiently stiff to support the web elements 42 that are in tension and supporting the load. A substantial amount of the applied load may be supported by the plurality of the web elements working in tension. For example, in one embodiment, at least 75% of the load is supported in tension, in another embodiment at least 85% of the load is supported in tension and in another embodiment at least 95% of the load is supported in tension. In other embodiments, less than 75% of the load can be supported in tension.

Although the generally annular inner ring 20, the generally annular outer ring 30, and the interconnected web 40 can be constructed of the same material, they can all have different thicknesses. That is, the generally annular inner ring can have a first thickness, $t_i$, the generally annular outer ring can have a second thickness, $t_o$, and the interconnected web can have a third thickness, $t_e$. In the embodiment shown in FIG. 1, the first thickness $t_i$ can be less than the second thickness $t_o$. However, the third thickness, $t_e$, can be less than either first thickness, $t_i$, or the second thickness, $t_o$. Thinner web elements 42 buckle more easily when subjected to a compressive force whereas a relatively thicker generally annular inner ring 20 and the generally annular outer ring 30 can advantageously help maintain lateral stiffness of non-pneumatic tire 10 in an unbuckled region by better resisting deformation.

Figure 4:
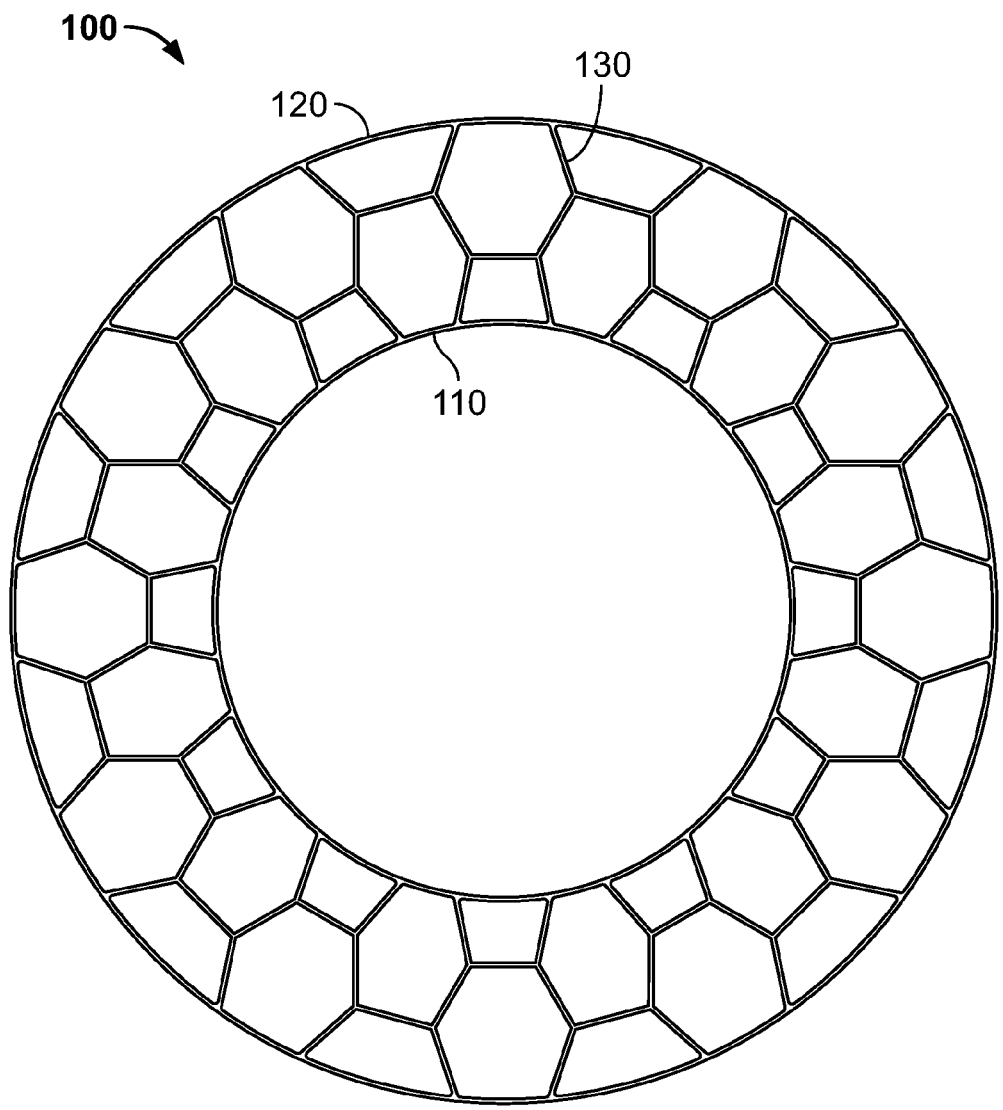
FIG. 4 is a front view of another embodiment of an undeformed non-pneumatic tire.

FIG. 4 illustrates a front view of another embodiment of a tire 100 having a generally annular inner ring 110, a generally annular outer ring 120, and a flexible, interconnected web extending between the inner ring 110 and the outer ring 120. The flexible, interconnected web is formed by a plurality of web elements 130 that define polygonal openings. In this particular embodiment, the web elements 130 form a plurality of hexagonal and substantially trapezoidal shapes, including an outer series of alternating hexagonal and trapezoidal opening and an inner series of alternating hexagonal and trapezoidal openings. It should be understand that the geometries shown in FIGS. 1-4 are merely exemplary and that any geometries may be employed.

In one embodiment, the connecting elements are constructed of polymeric materials having both a semi-crystalline (i.e., rigid) and amorphous (i.e., flexible) makeup. Additionally, one or both of the inner ring and outer ring may also be constructed of polymeric materials having both a semi-crystalline and amorphous makeup. If polymer chains contain both flexible and rigid segments, those segments can be rearranged with the application of external strains or stresses. The strains or stresses may be applied through tension or compression. Such chain rearrangement may cause a material property change resulting from the change of the network of polymers, rather than from a change of a single molecule. More specifically, the material property change may result from the alignment of the crystalline or rigid chains in the material. Such material property changes may be irreversible, or may only be reversible with the application of heat.

The materials for the connecting elements, the inner ring, or outer ring may be described as semi-rigid, semi-crystalline, semi-flexible, or semi-amorphous. The materials may be described as having a glassy domain and flexible segments. Materials having such a makeup include copolymers, such as block copolymers (e.g., styrenic block copolymers) and random polymers, and may include copolyesters (e.g., thermoplastic copolyesters) and copolyamides. More specifically, materials having a semi-crystalline and semi-amorphous structure include, without limitation, polyethylene terephthalate (PET), polybutylene terephthalate (PBT), polyhexylene terephthalate (PHT), polyoctylene terephthalate (POT), acrylonitrile butadiene styrene (ABS), styrene butadiene styrene (SBS), styrene-isoprene-styrene (SIS), styrene ethylene butylene styrene (SEBS), and a mixture of such polymers.

In one specific embodiment, the connecting elements are constructed of a material having an aliphatic chain that is flexible and an aromatic chain that is rigid. Examples of commercial materials having the above-described properties include, without limitation, HYTREL (manufactured by DUPONT), ARNITEL (manufactured by DSM), KRATON (manufactured by (KRATON POLYMERS), and RITE-FLEX (manufactured by TICONA-CELANESE CORP.)

Figure 5:
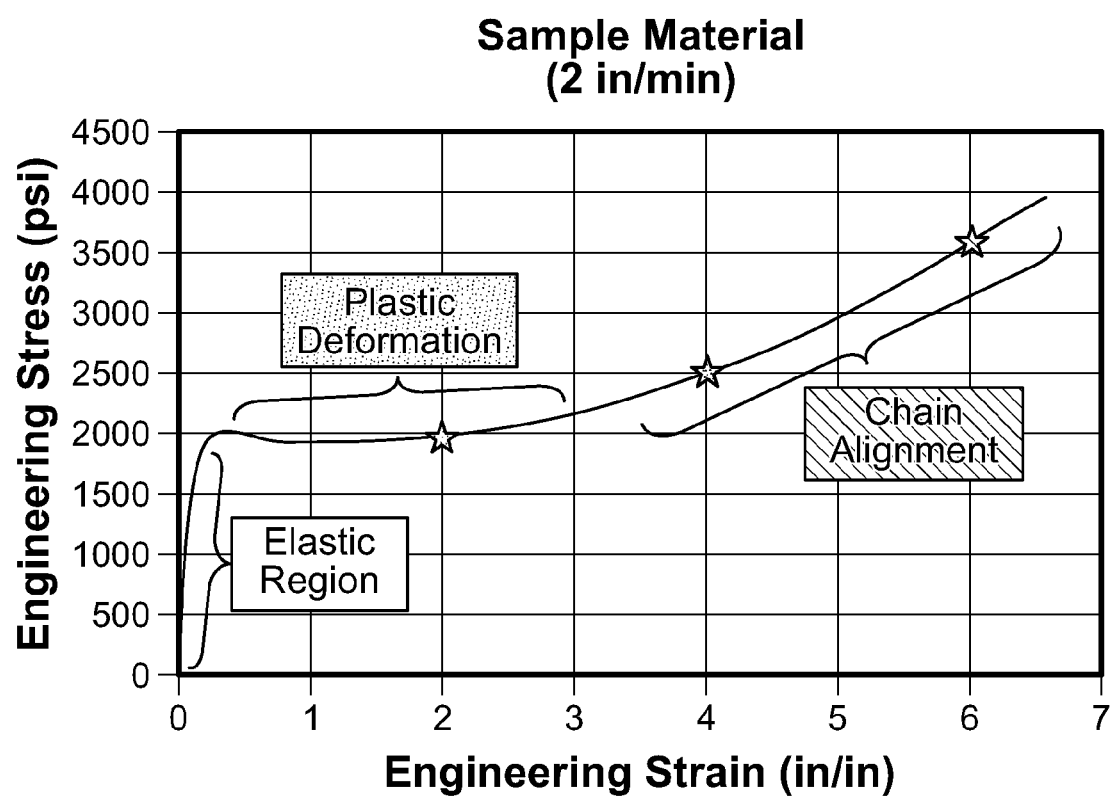
FIG. 5 is a stress/strain curve of a sample material.

FIG. 5 is a stress/strain curve of a sample material having both a semi-crystalline and semi-amorphous makeup. The curve shows how the sample material reacts to an increasing strain. As can be seen in this curve, the sample material is in an elastic region when under low levels of strain. That is, the sample material will return to its original shape if the load or strain is removed. In the specific example of FIG. 5, the sample material is in the elastic region when strained between 0 to about 0.3 in/in. When the sample material is in the elastic region, an increase of strain causes a corresponding sharp increase in engineering stress.

As can be further seen in the stress/strain curve of FIG. 5, the sample material experiences a plastic deformation if it is strained beyond the elastic region. That is, the sample material will change its shape and will not return to its original shape after the load or strain is removed. Soft thermoplastics have a rather large plastic deformation range, while hard thermoplastics have a minimal plastic deformation range. In the specific example of FIG. 5, the sample material has a plastic deformation range between about 0.3 in/in strain to about 3 in/in strain. An increase of strain when this material is in the plastic deformation range causes only a slight increase or even decrease in engineering stress.

As FIG. 5 further shows, the sample material experiences chain alignment if it is strained beyond the plastic deformation range. That is, the polymer chains begin to align on a molecular level and the mechanical properties and polymer phase and domain of the material change. More specifically, the sample material may begin to exhibit a more elastic behavior at a much higher modulus. In the specific example of FIG. 5, the material experiences chain alignment at strains above 3 in/in. An increase of strain on a chain aligned material causes an increase in engineering stress.

Generally, non-pneumatic tires are designed for performance in the elastic region, and it is considered undesirable to plastically deform any components of the non-pneumatic tire. However, if components of the tire are made of polymeric materials having both a semi-crystalline and semi-amorphous makeup, those polymeric materials may be pre-strained beyond the elastic region and plastic deformation until a desired chain alignment occurs, resulting in components having desirable material properties. The material may have a Shore D hardness between 30-60 and may be pre-strained by between 50-1200%.

Figure 6:
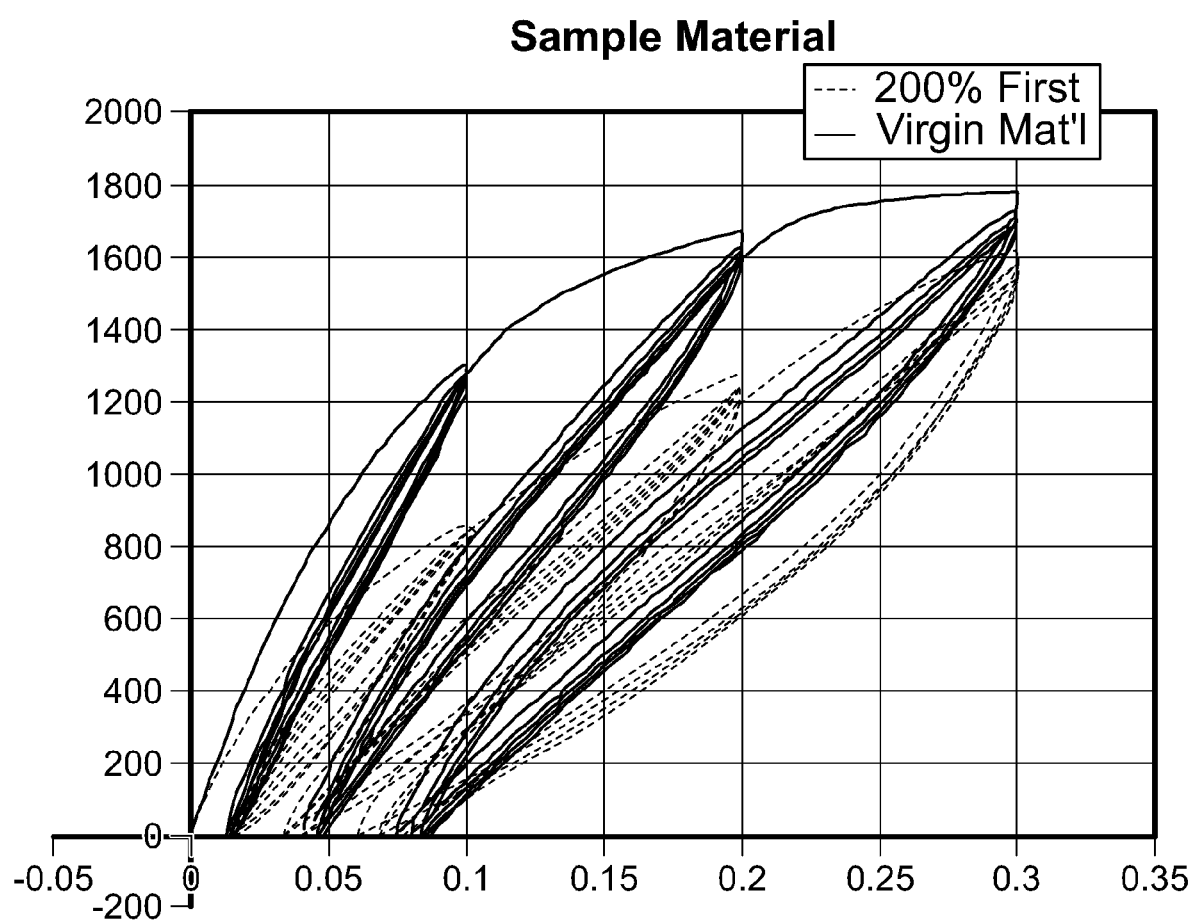
FIG. 6 is a stress/strain curve of the sample material compared to a sample of the same material that has been pre-strained by 200%.
Figure 7:
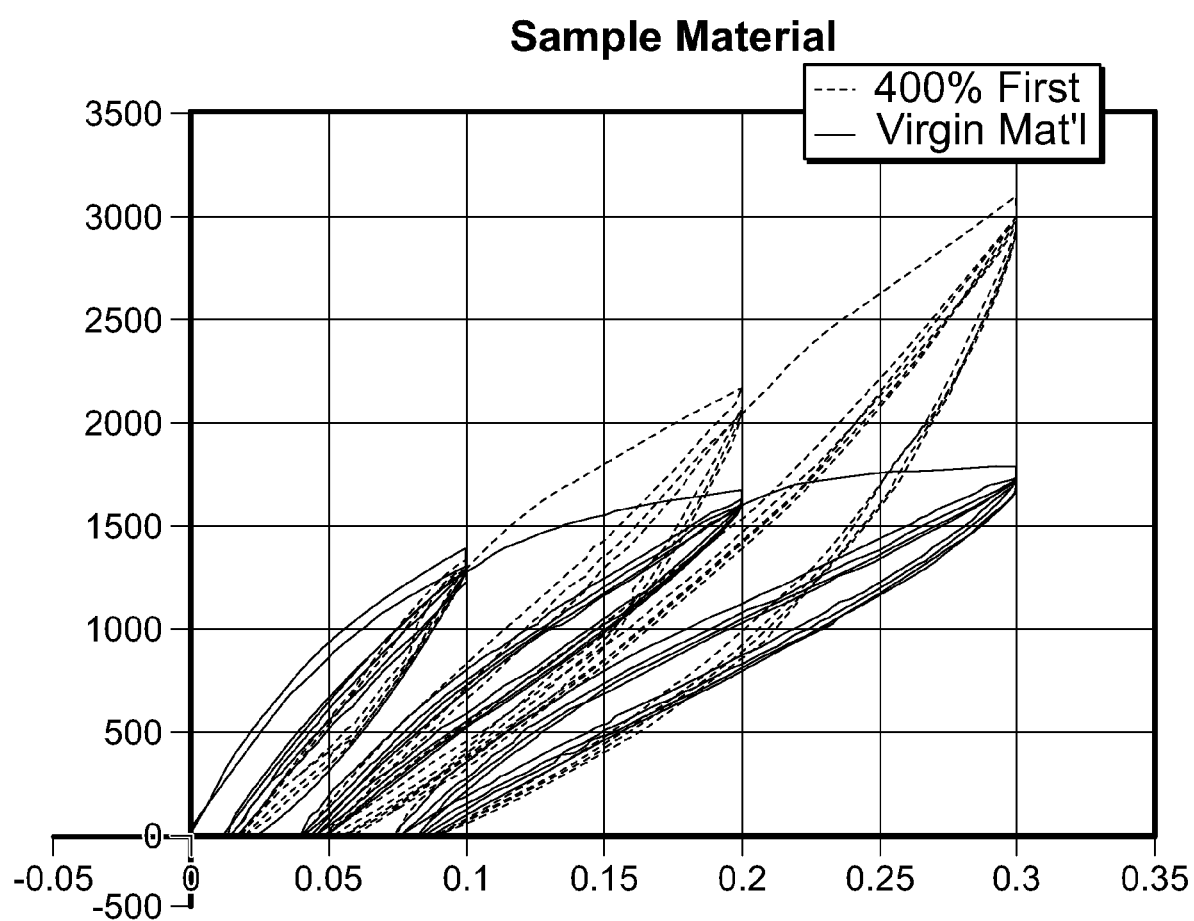
FIG. 7 is a stress/strain curve of the sample material compared to a sample of the same material that has been pre-strained by 400%.
Figure 8:
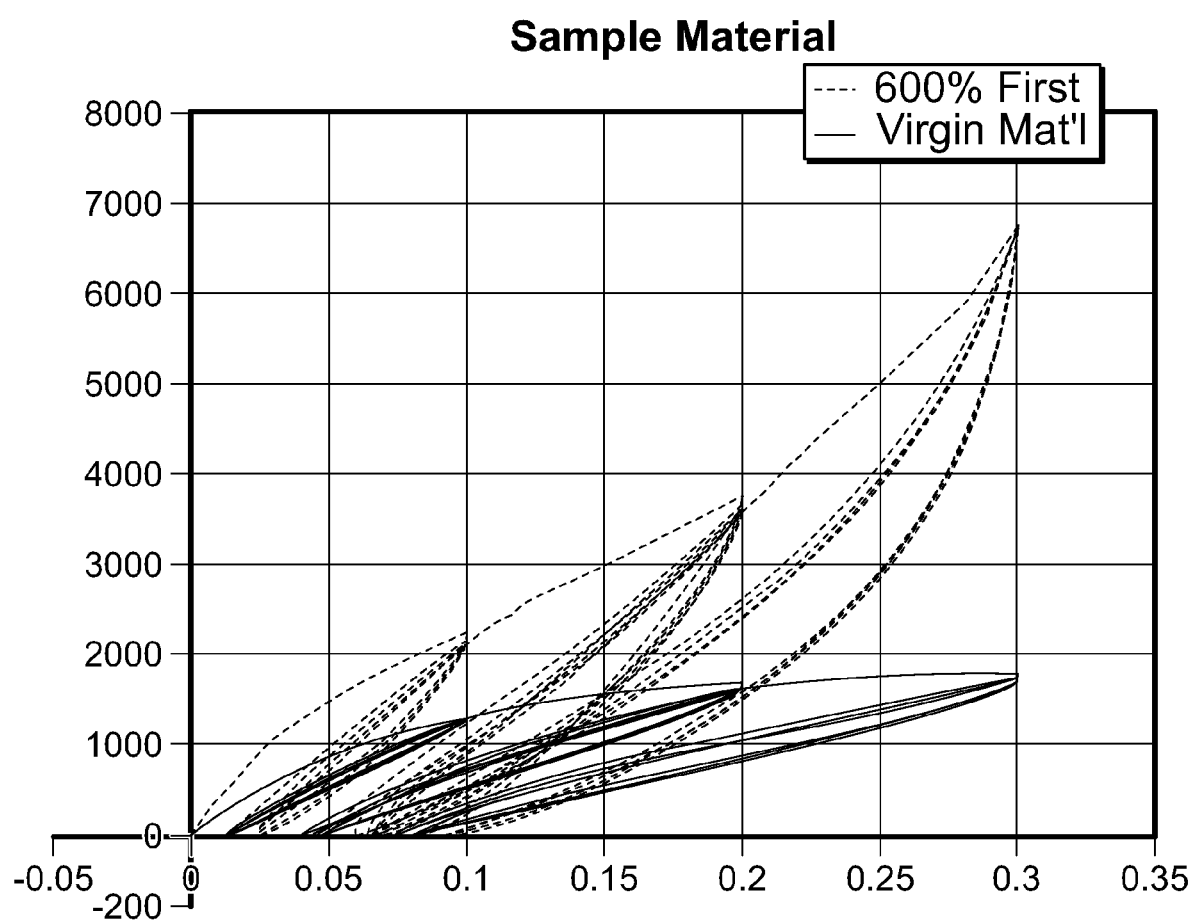
FIG. 8 is a stress/strain curve of the sample material compared to a sample of the same material that has been pre-strained by 600%.

FIGS. 6-8 show stress strain curves of one such sample material. Each figure shows a comparison between an unstrained, control sample compared to a sample that has been pre-strained. In each comparison, the control and the pre-strained sample were cycled multiple times between strains of 0 to 0.1 in/in, then between strains of 0 to 0.2 in/in, and then between 0 to 0.3 in/in.

FIG. 6 shows a stress strain curve comparing the unstrained, control sample to a sample that has been pre-strained 200% and then re-measured and re-set in the testing machine. At this level of pre-straining, the material is softened. The pre-strained sample experiences 0.1 in/in strain when stressed by about 800 psi, compared to about 1300 psi for the control sample. The pre-strained sample experiences 0.2 in/in strain when stressed by about 1300 psi, compared to about 1700 psi for the control sample. The pre-strained sample experiences 0.3 in/in strain when stressed by about 1600 psi, compared to about 1800 psi for the control sample. In other words, modulus of this material sample is reduced by between 10-40% by being pre-strained by 200%. Such results may indicate that the sample material has been pre-strained to a point in its plastic deformation range, without reaching chain realignment. However, it should be understood that other material samples may be in an elastic region at 200% strain, or may experience chain realignment at 200% strain.

FIG. 7 shows a stress strain curve comparing the unstrained, control sample to a sample that has been pre-strained 400% and then re-measured and re-set in the testing machine. At this level of pre-straining, the modulus of this material is increased. The pre-strained sample experiences 0.1 in/in strain when stressed by about 1300 psi, compared to about 1300 psi for the control sample. The pre-strained sample experiences 0.2 in/in strain when stressed by about 2000 psi, compared to about 1700 psi for the control sample. The pre-strained sample experiences 0.3 in/in strain when stressed by about 3000 psi, compared to about 1800 psi for the control sample. In other words, the modulus of this material sample is increased by between 0-65% by being pre-strained by 400%. Such results may indicate that the pre-strained sample material has experienced chain realignment. However, it should be understood that other material samples may be in an elastic region at 400% strain, or may experience plastic deformation at 400% strain.

FIG. 8 shows a stress strain curve comparing the unstrained, control sample to a sample that has been pre-strained 600% and then re-measured and re-set in the testing machine. At this level of pre-straining, the modulus of the material has significantly increased. The pre-strained sample experiences 0.1 in/in strain when stressed by about 2000 psi, compared to about 1300 psi for the control sample. The pre-strained sample experiences 0.2 in/in strain when stressed by about 3500 psi, compared to about 1700 psi for the control sample. The pre-strained sample experiences 0.3 in/in strain when stressed by about 6500 psi, compared to about 1800 psi for the control sample. In other words, the modulus of this material sample is increased by between 50-260% by being pre-strained by 600%. Such results may indicate that the pre-strained sample material has experienced chain realignment. However, it should be understood that other material samples may be in an elastic region at 600% strain, or may experience plastic deformation at 600% strain.

In some instances, it may be desirable to selectively stiffen sections of a tire component. In other instances, it may be desirable to selectively soften sections of a tire component. For example, it may be desirable to have a tire component with a range of moduli, between a minimum modulus and a maximum modulus. The different moduli may be achieved by selecting a material having the minimum modulus, and then stiffening the material at certain locations. Alternatively, a material having the maximum modulus may be selected, and the material may be softened at certain locations. As another alternative, a material having a modulus in between the minimum and maximum modulus may be selected. Such a material may be softened at certain locations and stiffened at others.

As illustrated by FIGS. 6-8, the desired softening or stiffening may be achieved by straining the material to a plastic deformation region or to chain alignment. While these figures show the results of straining a material between 200-600%, in other embodiments, it may be desirable to strain portions of a component between 50-1200%. The results of pre-straining a given material may vary based on the chemical composition of the material.

A non-pneumatic tire may be constructed with a material that is unstrained in some locations, and pre-strained in other locations. The level of pre-strain may vary in different locations along the tire. Thus, a material for a non-pneumatic tire may be selected according to its material properties in both an unstrained state and various pre-strained states. After a material has been selected, an initial tire may be formed. The initial tire may be formed by a molding process, an additive manufacturing process, or a subtractive manufacturing process.

Figure 9A:
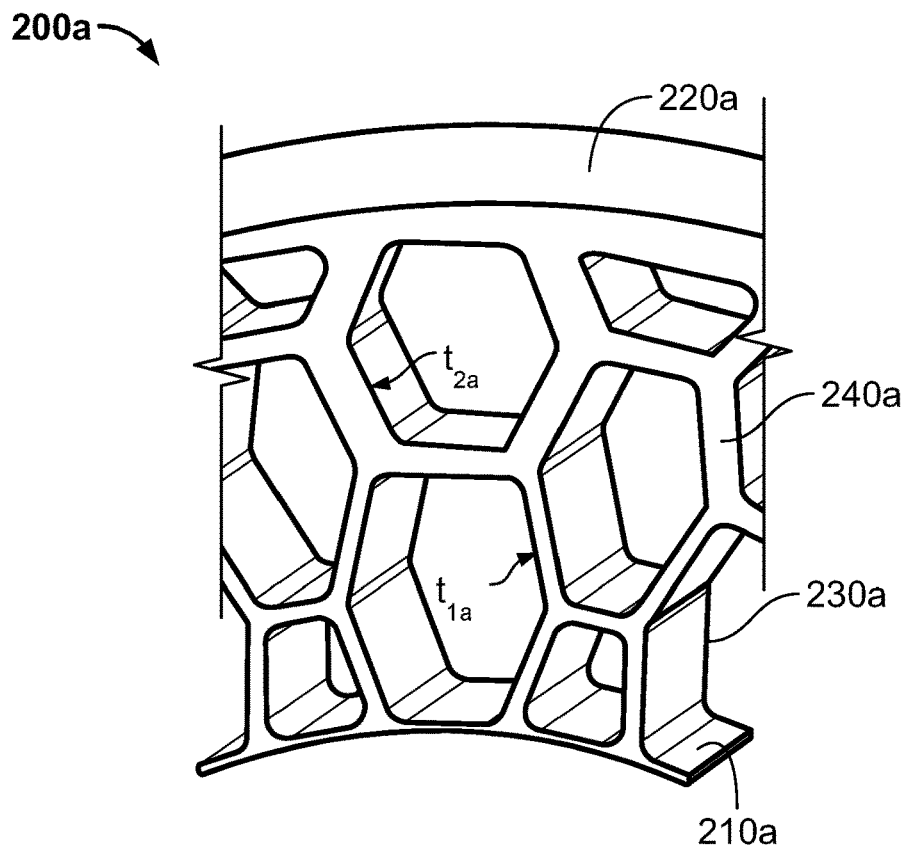
FIG. 9A is a perspective view of a portion of an initial non-pneumatic tire.

FIG. 9A illustrates a perspective view of a portion of one embodiment of an initial tire 200a. The initial tire 200a has an inner ring 210a with an inner diameter, an outer ring 220a with a first outer diameter, and a plurality of connecting elements extending from the inner ring 210a to the outer ring 220a. The plurality of connecting elements includes inner connecting elements 230a having a first initial thickness $t_{1a}$ and outer connecting elements 240a having a second initial thickness $t_{2a}$ that is greater than the first initial thickness $t_{1a}$. It should be understood that the thicknesses of each of the connecting elements may vary.

Portions of the initial tire 200a are then pre-strained by stretching the outer ring 200a in a radial direction, until the outer ring has a second outer diameter greater than the first outer diameter. The tire may then be relaxed, allowing the outer ring to contract to a third outer diameter that is greater than the first outer diameter and less than the second outer diameter.

The plurality of connecting elements 230a, 240a remain connected to the inner ring 210a and the outer ring 220a during the stretching of the outer ring 220a, such that the stretching the outer ring 220a in a radial direction causes at least some of the plurality of connecting elements 230a, 240a to stretch in a radial direction. The plurality of connecting elements 230a, 240a likewise remain connected to the inner ring 210a and the outer ring 220a after the stretching of the outer ring 220a.

In one embodiment, the inner ring 210a and the inner connecting elements 230a are restrained to prevent them from stretching, so that only the outer connecting elements 240a and the outer ring 220a are stretched. In an alternative embodiment, the inner connecting elements are also stretched. In another alternative embodiment, the inner ring is also stretched. In such an embodiment, the inner ring would have a final inner diameter greater than the initial inner diameter.

Figure 9B:
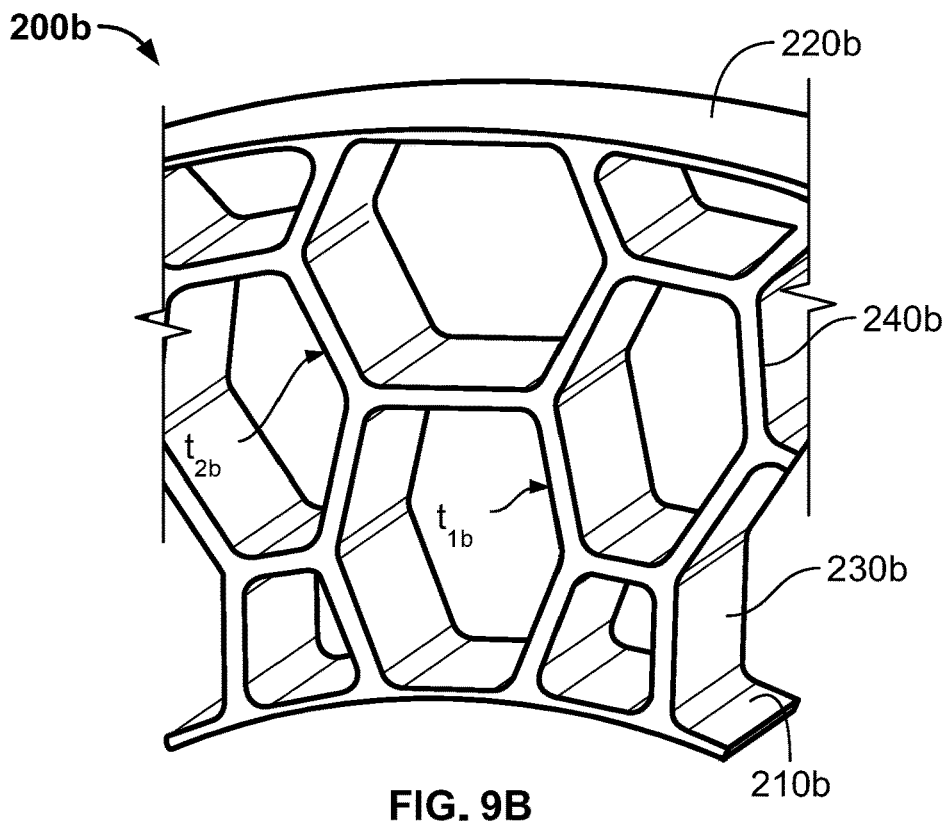
FIG. 9B is a perspective view of the portion of an non-pneumatic initial tire after a pre-straining process.

An example of a portion of a resulting tire 200b is shown in perspective view in FIG. 9B. In this embodiment, the resulting dimensions of inner ring 210b and inner connecting elements 230b are substantially the same as the initial inner ring 210a and inner connecting elements 230a. The inner diameter of the resulting inner ring 210b is the same as the inner diameter of the initial inner ring 210a. The resulting inner connecting elements 230b have a first thickness $t_{1b}$ that is the same as the first thickness $t_{1a}$ of the initial inner connecting elements 230a.

By contrast, the resulting outer ring 220b and outer connecting elements 240b have been stretched and are thus substantially thinner and longer than initial outer ring 220a and outer connecting elements 240a. The resulting outer connecting elements 240b have a second thickness $t_{2b}$ that is less than the second thickness $t_{2a}$ of the initial inner connecting elements 240a.

Figure 10B:
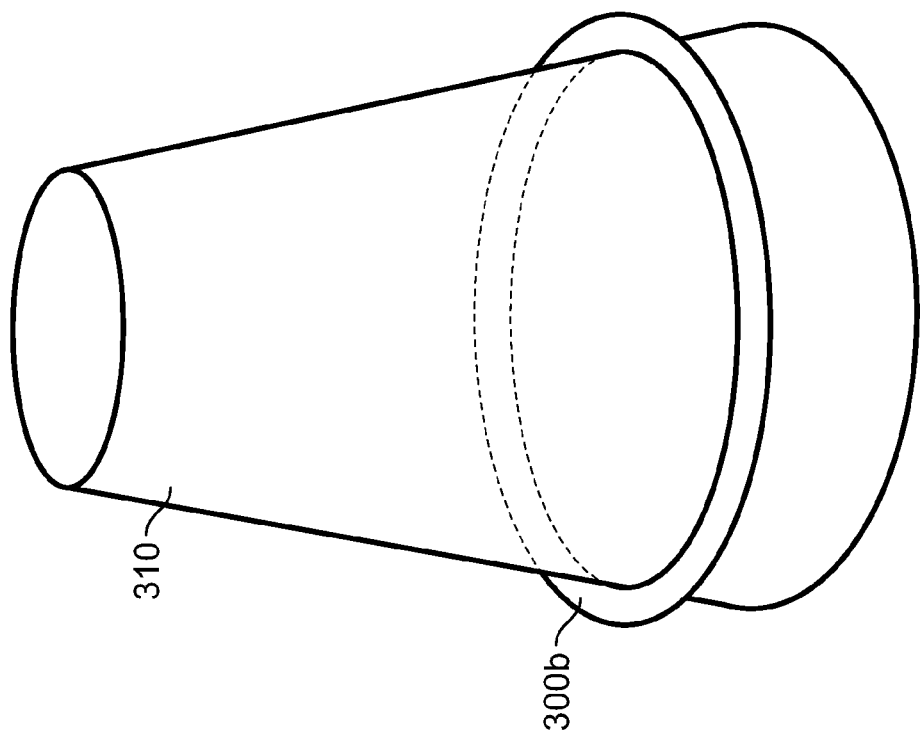
FIGS. 10A-B are schematic drawings illustrating a tapered die for pre-straining a tire.
Figure 10A:
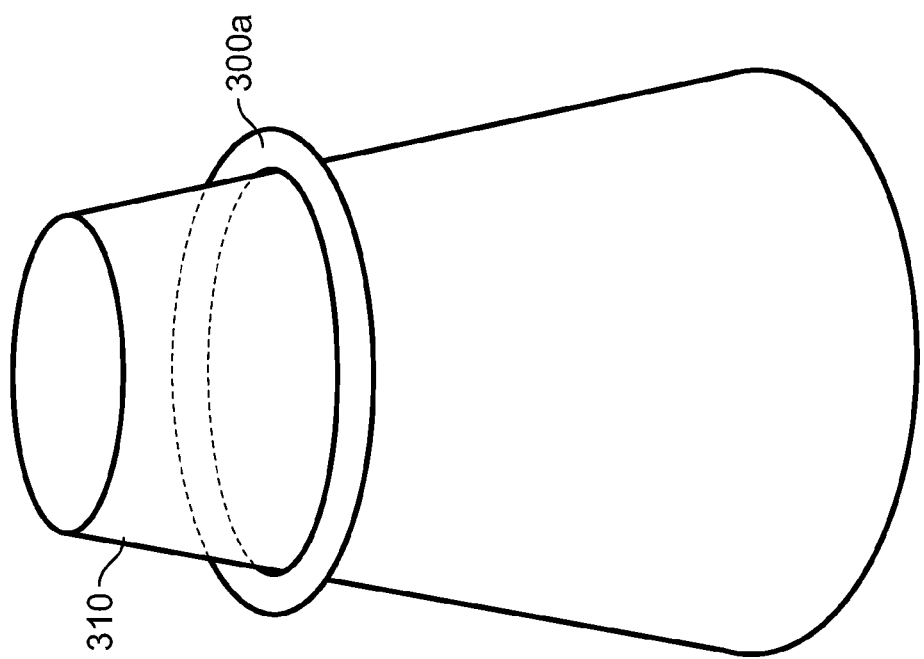

The tire components may be stretched in a number of different ways. In one embodiment, different portions of the tire are retained, then pulled apart. In another embodiment, rollers may be applied to tire components to roll the components into an elongated shape. In another embodiment, shown schematically in FIGS. 10A and 10B, an initial tire 300a is placed on a small end of a tapered die 310. Force is then applied to move the initial tire 300a towards a large end of the tapered die 310 until the dimensions of a desired final tire 300b are achieved. While the die 310 is shown as being cone-shaped in these figures, the die need not be cone-shaped, but may have any tapered shape.

In another embodiment, rather than forming a complete initial tire, and then stretching components of the fully formed tire, a plurality of initial tire components are formed. The initial components are then stretched as desired, and then assembled to form a complete tire. The initial tire components may be tire sectors that are assembled in a circumferential direction. The initial tire components may also be discs that are assembled together in a radial direction. Alternatively, the initial tire components may be tire sectors that are assembled in both a circumferential direction.

Figure 11:
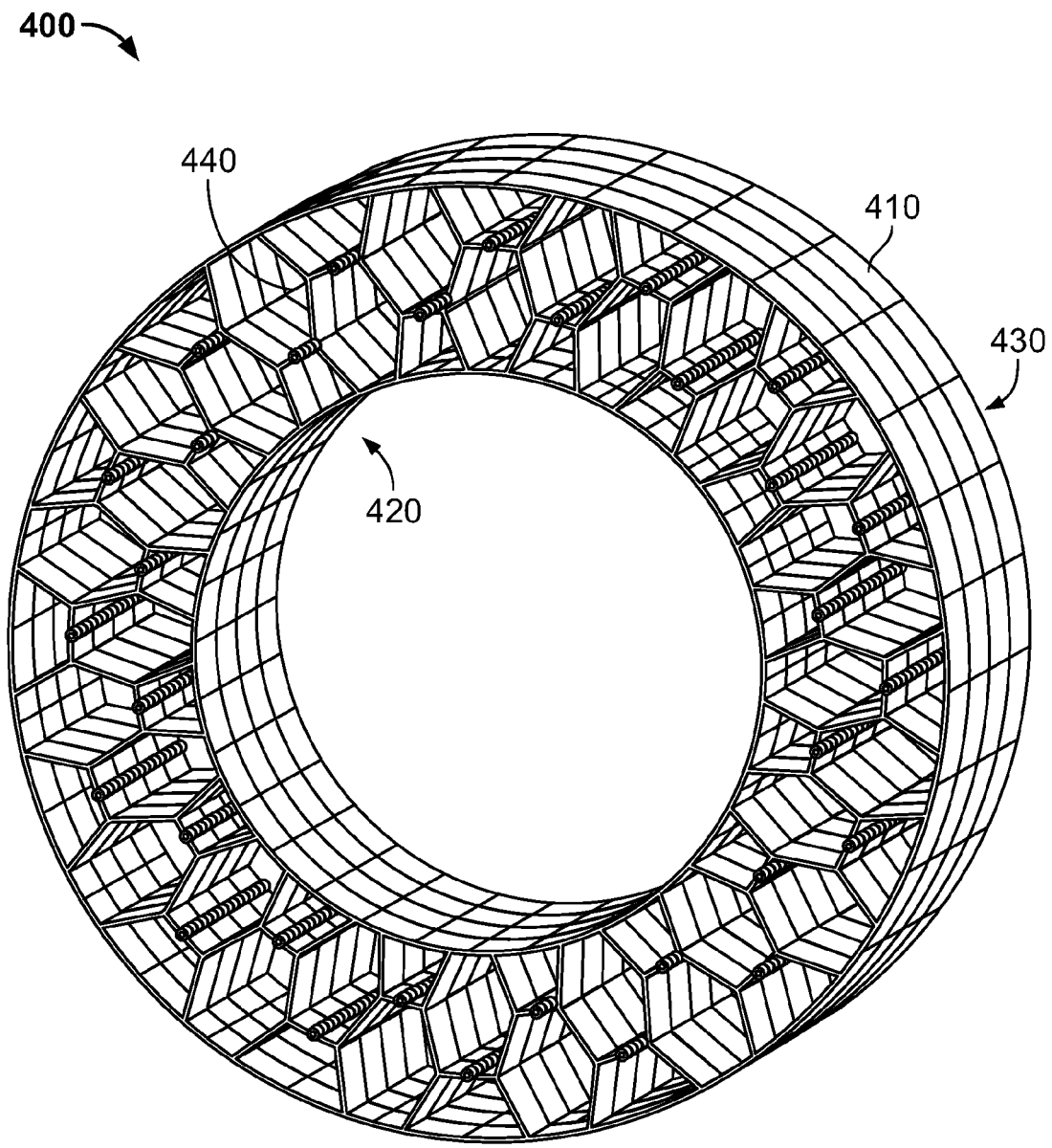
FIG. 11 is a perspective view of one embodiment of a non-pneumatic tire formed by a plurality of hingedly connected web sectors.

For example, FIG. 11 illustrates a perspective view of a non-pneumatic tire 400 formed by a plurality of connected web sectors 410 having components that have been pre-strained. In this embodiment, the width of the tire 400 is defined by four adjacent web sectors 410. Thus, an inner ring 420 of the tire 400 is formed by four axially adjacent inner ring portions of the web sectors 410, and an outer ring 430 is formed by four axially adjacent outer ring portions of the web sectors 410. Likewise, a flexible, interconnected web 440 of the tire 400 is formed by four axially adjacent web portions of the web sectors 410. In alternative embodiments, any number of axially adjacent web sectors may be employed. Assembling a non-pneumatic tire in this manner allows the tire to be tuned by varying the amount of pre-strain applied to any portion of any tire component.

Additionally, FIG. 11 further shows web sectors disposed circumferentially about the tire 400 to form the generally annular, flexible, and interconnected web 410. In the illustrated embodiment, an inner ring 420 of the tire 400 is formed by a plurality of inner ring sectors that are circumferentially adjacent, and an outer ring 430 is formed by a plurality of outer ring sectors that are circumferentially adjacent.

Figure 12A:
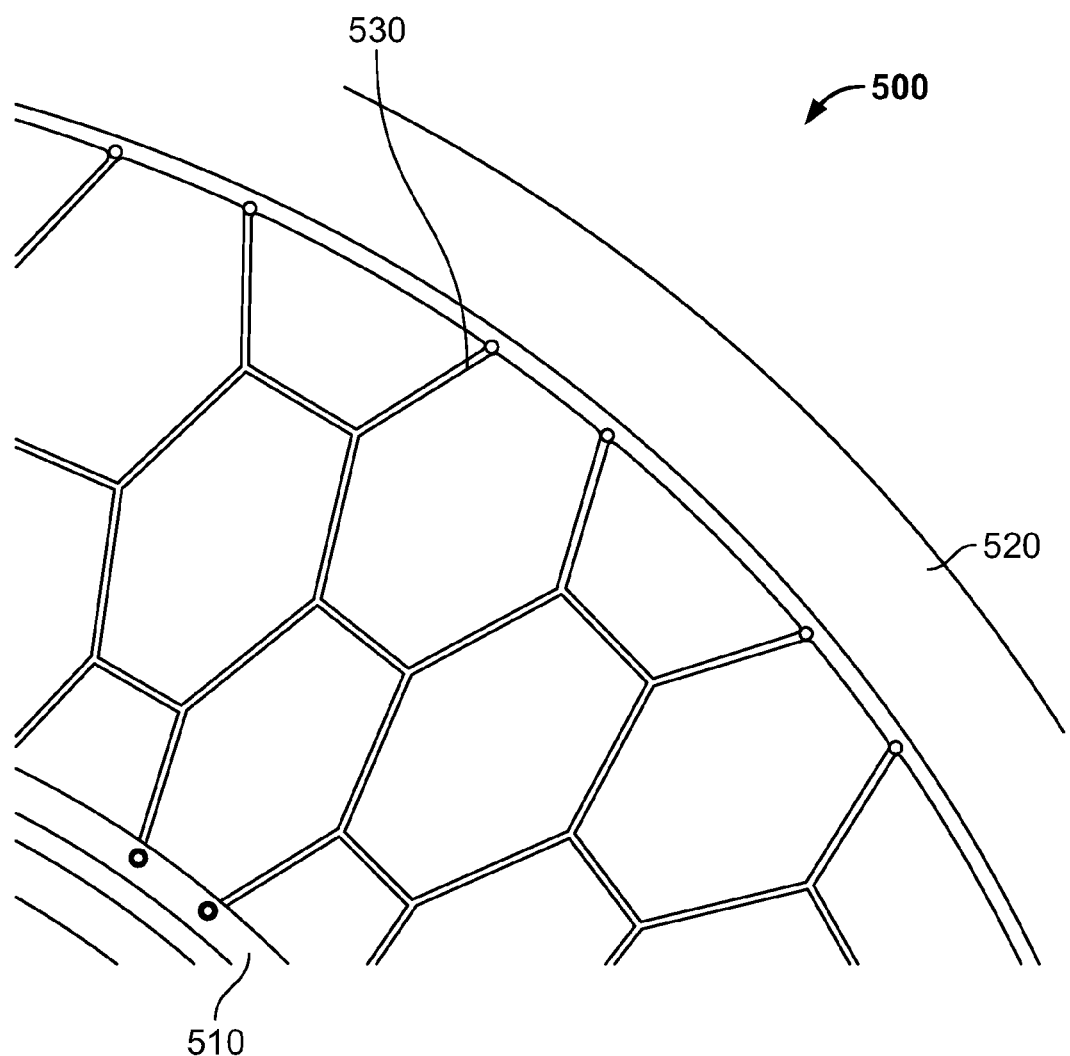
FIG. 12A is a front view of a portion of one embodiment of a non-pneumatic tire with a web hingedly connected to an outer ring.
Figure 12B:
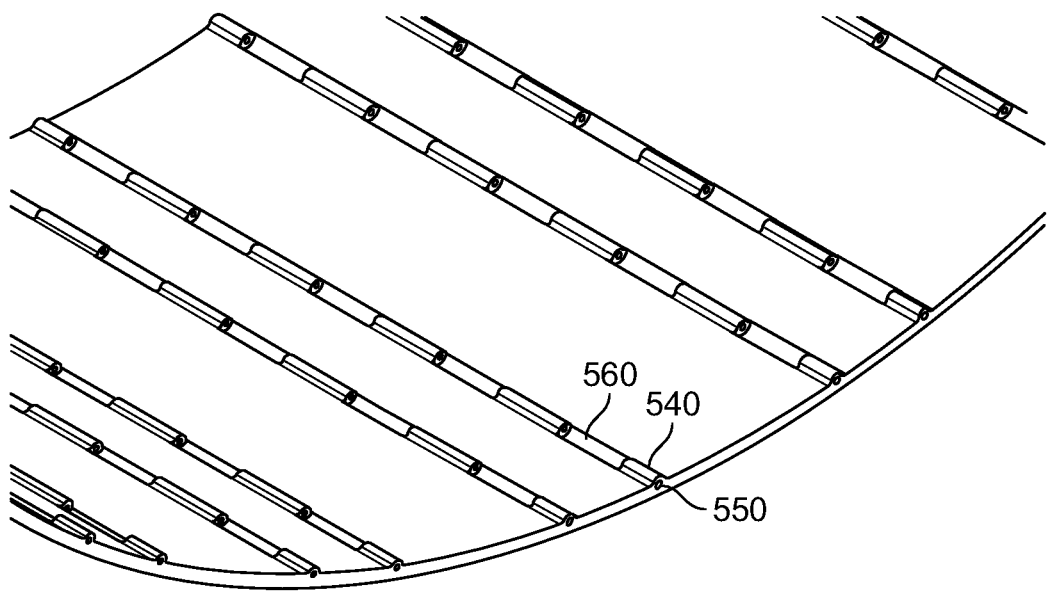
FIG. 12B is a perspective view of a portion of the outer ring shown in FIG. 12A.
Figure 12C:
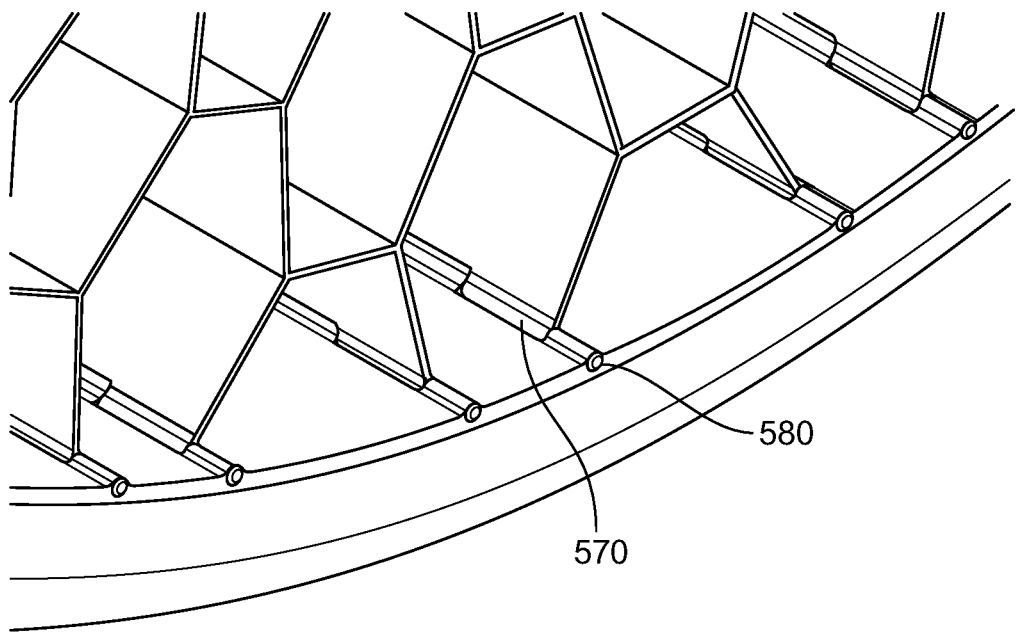
FIG. 12C is a detail view of a hinged connection between the web and the outer ring of FIG. 12A.

In another embodiment, the connecting elements may be formed separately from the inner ring and outer ring. Such an embodiment allows the connecting elements to be pre-strained, while leaving both the inner ring and outer ring in an unstrained condition. FIGS. 12A-12C illustrate an example of one such embodiment. FIG. 12A illustrates a front view of a portion of one embodiment of a non-pneumatic tire 500 with an inner ring 510, an outer ring 520, and a web 530. Here, the web 530 is hingedly connected to the inner ring 510 and hingedly connected to the outer ring 520. In alternative embodiments (not shown), the web is fixedly connected to at least one of the outer ring and the inner ring.

In the illustrated embodiment, the outer ring 520 is a solid ring. In an alternative embodiment, the outer ring is constructed of a plurality of ring portions. The ring portions may be ring sectors that extend circumferentially about the tire. Alternatively, the ring portions may by axially adjacent hoops. In another alternative embodiment, the ring portions may be a series of ring portions that are aligned in both the circumferential and axial directions to form a ring.

FIG. 12B illustrates a perspective view of a portion of the outer ring 520, and FIG. 12C illustrates a detail view of a hinged connection between the web 530 and the outer ring 520. As can be seen in these views, the outer ring 520 includes a plurality of axially spaced barrels 540 at several circumferential locations. Each axially spaced barrel 540 includes a thru-hole 550 extending in the axial direction. In the illustrated embodiment the axially spaced barrels 540 are separated by flat portions 560. In alternative embodiments, the axially spaced barrels may be separated by grooved portions or apertures.

The web 530 includes corresponding barrels 570 with corresponding thru-holes (not shown). The corresponding barrels 570 are disposed in the flat portions 560 such that they are aligned with the axially spaced barrels 540. A pin 580 is inserted into the thru-holes of the barrels 540, 570 to form a hinged connection.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A method of making a non-pneumatic tire, the method comprising:
    forming an initial tire having:
        an inner ring having an inner diameter,
        an outer ring having a first outer diameter, the outer ring being constructed of a polymeric material, and
        a plurality of connecting elements extending from the inner ring to the outer ring; and
    stretching the outer ring in a radial direction beyond an elastic region and a plastic deformation of the polymeric material, until the outer ring has a second outer diameter greater than the first outer diameter,
        wherein the plurality of connecting elements remain connected to the inner ring and the outer ring during the stretching of the outer ring, such that the stretching of the outer ring in a radial direction causes the plurality of connecting elements to stretch in a radial direction, and
        wherein the plurality of connecting elements remain connected to the inner ring and the outer ring after the stretching of the outer ring.

2. The method of claim 1, further comprising relaxing the outer ring, thereby allowing the outer ring to contract to a third outer diameter that is greater than the first outer diameter and less than the second outer diameter.

3. The method of claim 1, wherein the stretching of the outer ring causes the inner ring to stretch from a first inner diameter to a second inner diameter greater than the first inner diameter.

4. The method of claim 1, wherein the inner diameter of the inner ring remains constant during the stretching of the outer ring.

5. The method of claim 1, wherein the stretching of the outer ring includes placing the initial tire on a small end of a tapered die and moving the initial tire relative to the tapered die, towards a large end.

6. The method of claim 1, wherein the stretching of the outer ring includes applying a strain of at least 50% to at least one of the plurality of connecting elements.

7. The method of claim 1, wherein the forming of the initial tire includes molding the initial tire.

8. The method of claim 1, wherein the forming of the initial tire includes:
  forming a plurality of initial tire components; and
  assembling the plurality of initial tire components.

9. The method of claim 8, wherein the stretching of the outer ring is performed prior to the assembling of the plurality of initial tire components.

10. The method of claim 1, wherein the connecting elements have a semi-crystalline and amorphous makeup.

* * * * *